(12) United States Patent
Ouzounis (10) Patent No.: US 10,691,942 B2
(45) Date of Patent: Jun. 23, 2020

(54) UNSUPERVISED LAND USE AND LAND COVER DETECTION

(71) Applicant: DigitalGlobe, Inc., Westminster, CO (US)

(72) Inventor: Georgios Ouzounis, Longmont, CO (US)

(73) Assignee: DIGITALGLOBE, INC., Westminster, CO (US)

( * ) Notice: Subject to any disclaimer, the term of this patent is extended or adjusted under 35 U.S.C. 154(b) by 101 days.

(21) Appl. No.: 15/812,124

(22) Filed: Nov. 14, 2017

(65) Prior Publication Data

US 2018/0336394 A1    Nov. 22, 2018

Related U.S. Application Data

(60) Provisional application No. 62/505,074, filed on May 11, 2017.

(51) Int. Cl.
| | | |
|---|---|---|
| *G06K 9/00* | (2006.01) | |
| *G06T 7/12* | (2017.01) | |
| *G06T 7/11* | (2017.01) | |
| *G06T 7/00* | (2017.01) | |
| *G06K 9/62* | (2006.01) | |
| *G06T 7/90* | (2017.01) | |
| *G06F 16/583* | (2019.01) | |
| *G06K 9/40* | (2006.01) | |

(52) U.S. Cl.
CPC ....... *G06K 9/0063* (2013.01); *G06F 16/5854* (2019.01); *G06K 9/00637* (2013.01); *G06K 9/627* (2013.01); *G06K 9/6215* (2013.01); *G06K 9/6219* (2013.01); *G06K 9/6221* (2013.01); *G06K 9/6242* (2013.01); *G06K 9/6267* (2013.01); *G06K 9/6282* (2013.01); *G06T 7/0002* (2013.01); *G06T 7/0004* (2013.01); *G06T 7/11* (2017.01); *G06T 7/12* (2017.01); *G06T 7/90* (2017.01); *G06K 9/40* (2013.01); *G06T 2207/10024* (2013.01); *G06T 2207/10036* (2013.01); *G06T 2207/30181* (2013.01); *G06T 2207/30184* (2013.01); *G06T 2207/30188* (2013.01)

(58) Field of Classification Search
CPC .......................... G06K 9/0063–00657; G06K 9/00624–00657; G06T 7/10–7/194
See application file for complete search history.

(56) References Cited

U.S. PATENT DOCUMENTS

| | | | | |
|---|---|---|---|---|
| 5,323,317 A | * | 6/1994 | Hampton | B64G 1/66 702/3 |
| 2006/0018566 A1 | * | 1/2006 | Coleman | G06K 9/0063 382/312 |
| 2009/0214084 A1 | * | 8/2009 | Asner | G06K 9/00657 382/110 |

(Continued)

*Primary Examiner* — Robert J Hance
(74) *Attorney, Agent, or Firm* — Brian R. Galvin; Galvin Patent Law LLC (57) ABSTRACT

A system and methods for unsupervised land use and land cover detection using a classifier that produces a plurality of class image layers which are filtered to remove misclassified same-label pixel groupings, a class resolution module that reduces multiple pixel labels to a single one if applicable and a reconstruction module that generates the output land use and land cover image.

7 Claims, 11 Drawing Sheets

(56) References Cited

U.S. PATENT DOCUMENTS

| | | | |
|---|---|---|---|
| 2014/0119639 A1* | 5/2014 | Shah | G06K 9/0063 |
| | | | 382/154 |
| 2014/0270359 A1* | 9/2014 | Baker | G06K 9/0063 |
| | | | 382/103 |
| 2016/0125645 A1* | 5/2016 | Khormi | G06T 17/05 |
| | | | 382/103 |
| 2017/0083747 A1* | 3/2017 | Guan | G06K 9/0063 |
| 2017/0161584 A1* | 6/2017 | Guan | G06K 9/6269 |

* cited by examiner

UNSUPERVISED LAND USE AND LAND COVER DETECTION

CROSS-REFERENCE TO RELATED APPLICATIONS

The present application claims the benefit of, and priority to, U.S. provisional patent application Ser. No. 62/505,074, titled "SHAPE-BASED SEGMENTATION USING HIERARCHICAL IMAGE REPRESENTATIONS FOR AUTOMATIC TRAINING DATA GENERATION AND SEARCH SPACE SPECIFICATION FOR MACHINE LEARNING ALGORITHMS", filed on May 11, 2017, the entire specification of which is incorporated herein by reference.

BACKGROUND

Field of the Art

The aspects described herein describe a system and methods for unsupervised land use and land cover detection using a set of classification algorithms that produce image layers based on the pixel classes, image filters that remove class noise and a class resolution engine that assigns unique class labels to pixels that appear in more than a single image layer.

Discussion of the State of the Art

Identifying regions of land usage or land coverage in satellite imagery using LANDSAT data tends to yield low-resolution and inaccurate results, often underestimating the size or usage patterns. Instead, an automated approach is needed that uses multispectral satellite imagery that has been adjusted to compensate for atmospheric properties (such as cloud cover) to provide more accurate results with a fast, scalable operation that can accommodate the wide variety of image data that may be utilized.

What is needed, therefore, is an unsupervised means to reliably identify land use and land cover with greater accuracy, using readily available multispectral satellite or aerial imagery.

SUMMARY

Accordingly, the inventor has conceived and reduced to practice, a system and methods for unsupervised land use and land cover detection.

The aspects described herein describe a system and methods for unsupervised land use and land cover detection using a class resolution engine that processes pixels within a hierarchical image representation to apply class labels to the pixels, and then produce image layers based on the pixel classes.

According to one aspect, a system for unsupervised land use and land cover detection, comprising: a classification system comprising a processor, a memory, and a plurality of programming instructions stored in the memory and operating on the processor, wherein the programming instructions, when operating on the processor, cause the processor to: receive an image; algorithmically process the image to produce a set of layers each corresponding to a particular class; a layer filtering module and a class resolution module comprising a processor, a memory, and a plurality of programming instructions stored in the memory and operating on the processor, wherein the programming instructions, when operating on the processor, cause the processor to: receive an image; perform a plurality of pixel-based analysis operations on at least a portion of the pixel data within the image; apply a plurality of class labels to pixels based at least in part on the analysis operations; produce a plurality of image layers based at least in part on the class labels; an image reconstruction engine comprising a processor, a memory, and a plurality of programming instructions stored in the memory and operating on the processor, wherein the programming instructions, when operating on the processor, cause the processor to: receive a plurality of image layers from the class resolution module; and reconstruct the image based at least in part on the image layers, is disclosed.

According to another aspect, a method for unsupervised land use and land cover detection, comprising the steps of: producing, using a classifier, a plurality of class labels to pixels within the image; applying image filters to remove same-class pixel groupings that fail some empirical class-related criteria such as size, shape, color, etc.; assigning, using a class resolution module, unique class labels to pixels of multiple class labels, is disclosed.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

The inventor has conceived, and reduced to practice, a system and methods for unsupervised land use and land cover detection.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

Figure 1:
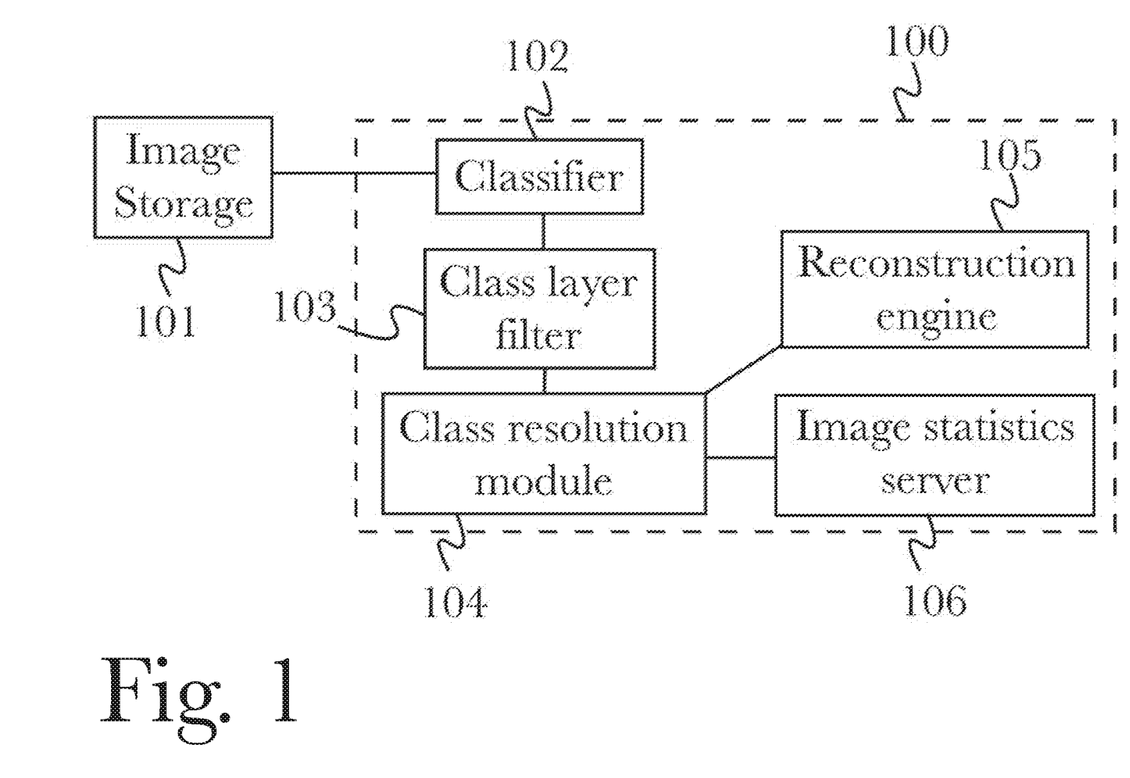
FIG. 1 is a block diagram illustrating an exemplary system architecture for unsupervised land use and land cover detection, according to one aspect.

FIG. 1 is a block diagram illustrating an exemplary system architecture 100 for unsupervised land use and land cover detection, according to one aspect. According to the aspect, an image storage 101 may comprise a database or other data store that stores and provides images for use by a classifier 102 to produce a plurality of class layers from each input image FIGS. 4-7. Class layers may then be filtered 103 to remove same-class pixel groupings that fail empirical class-related size, shape and color criteria. Filtered class-layers may then be used by a class resolution module 104 that may detect pixels with more than a single class label and reduce the plurality of labels to a single one based on ordering rule. Filtered and resolved layers (images) may then be used by a reconstruction engine 105 to create a color composite output image in which each class is represented by a unique color, while an image statistics server 106 analyzes a number of image-based statistics such as (for example) feature detection and pixel-based layer information.

Detailed Description of Exemplary Aspects

Figure 2:
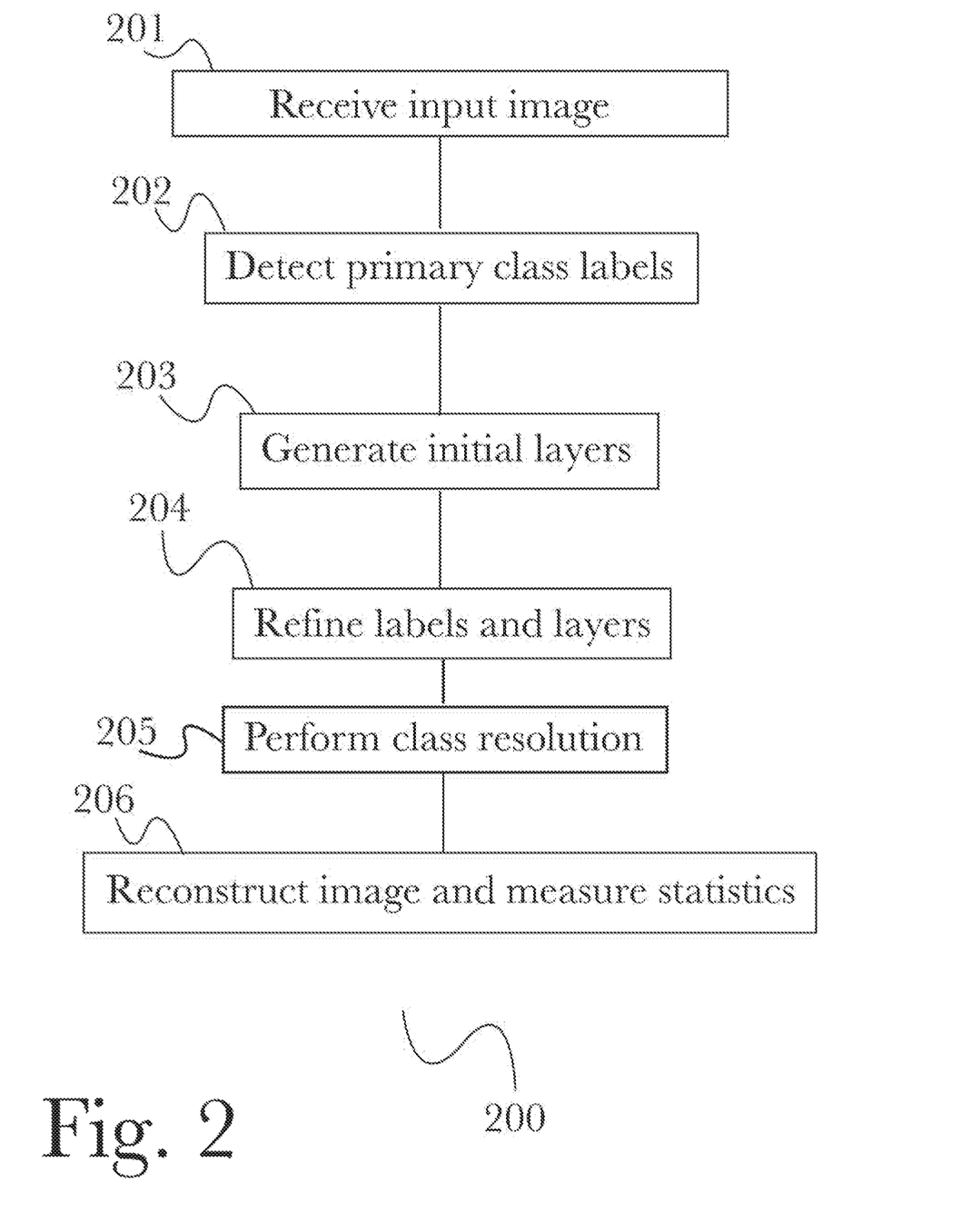
FIG. 2 is a flow diagram illustrating an exemplary method for unsupervised land use and land cover, according to one aspect.

FIG. 2 is a flow diagram illustrating an exemplary method 200 for unsupervised land use and land cover detection, according to one aspect. In an initial step 201, a class resolution module 103 may receive an image hierarchical model from a hierarchy generator 102 to use for processing. Class resolution module 103 may then 202 detect a plurality of primary image class labels identifying features present in the image data, and may use these to generate a set of initial image layers with each layer corresponding to a class label 203. In a next step 204, these image labels and layers may then be refined using size and shape filters (described in greater detail below, referring to FIG. 3, and specific examples of which are described in FIGS. 4-7) that employ a union-find algorithm for generating partitions of space and attribute each cell using a single pass through the image data, during which incremental auxiliary data (attribute ingredients) is collected as processing progresses through the image hierarchy. In a next step 205, class resolution module 103 may resolve class labels and layers, and when processing is complete the image may be reconstructed 206 by a reconstruction engine 104 from the refined layers, and image statistics may be analyzed by an image statistics server 105 using the refined data. Reconstruction may comprise (for example, including but not limited to) operations for RGB class labeling, integer class labeling, binary ("one against all") class labeling, vectorization and cell attribution.

Figure 3:
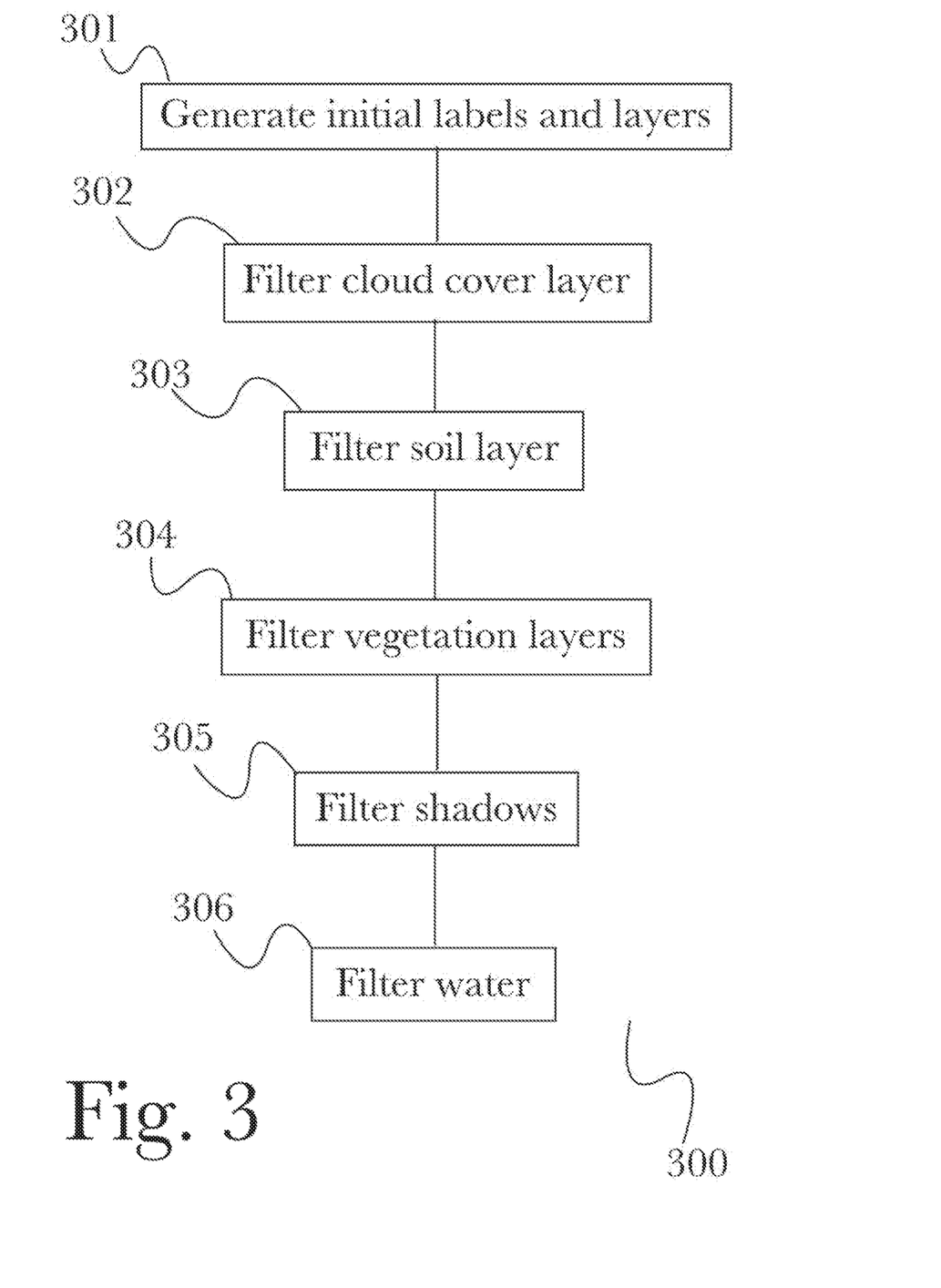
FIG. 3 is a flow diagram illustrating an exemplary method for unsupervised land use and land cover, illustrating a class-based layer filtering process according to one aspect.

FIG. 3 is a flow diagram illustrating an exemplary method 300 for unsupervised land use and land cover detection, illustrating a class-based layer filtering process according to one aspect. In an initial step 301, a class resolution module 103 may generate a set of initial class labels for an image hierarchy received from a hierarchy generator 102, and produce a set of image layers corresponding to the labels. In a next step 302, a cloud-cover layer may be filtered, identifying all dense cloud forms regardless of saturation levels. In a next step 303, a soil layer may then be filtered for topsoil, excluding rocks, gravel, sand, or other unwanted ground cover features. In a next step 304, a vegetation layer may be filtered for all types of vegetation, or for all "healthy" or green vegetation (for example, for vegetation growth analysis or similar ecology uses). In a next step 305, shadows or a selected type or set of shadows may be filtered, and in a final step 306 bodies of water such as lakes, rivers, oceans, or swamps may be filtered. Some exemplary class-based filters are described in greater detail below, referring to FIGS. 4-7.

Figure 4:
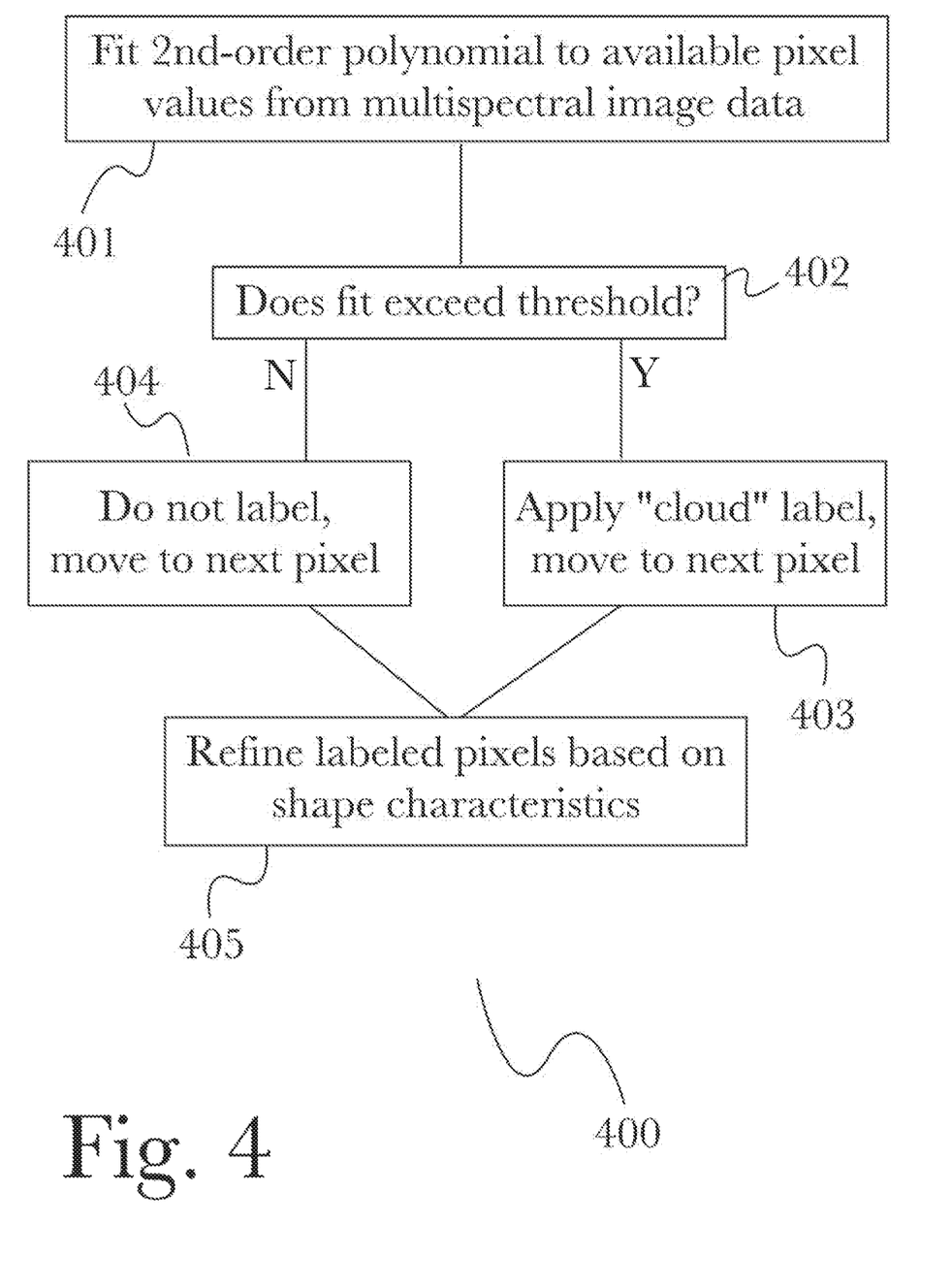
FIG. 4 is a flow diagram illustrating an exemplary method for unsupervised land use and land cover detection, illustrating a cloud filtering process according to one aspect.

FIG. 4 is a flow diagram illustrating an exemplary method 400 for unsupervised land use and land cover detection, illustrating a cloud detection process according to one aspect. According to the aspect, clouds may be detected using a parabolic function fit method 400, wherein a classifier module 102 first fits a second-order polynomial to the available pixel values 401 Generally, each pixel of an image will have multiple values corresponding to the spectral bands used when recording the image, for example 8 values for an 8-band image. In a next step 402 the fit of the parabolic function to the actual data values is examined, and if it exceeds a defined acceptability threshold, the "cloud" label is applied to the pixel 403. If the threshold is not met, processing proceeds to the next pixel 404 without applying the label. After selecting pixels based on the function, they may be refined 405 based on shape characteristics such as size, width, or compactness, to identify larger cloud formations comprising individual labeled pixels.

Figure 5:
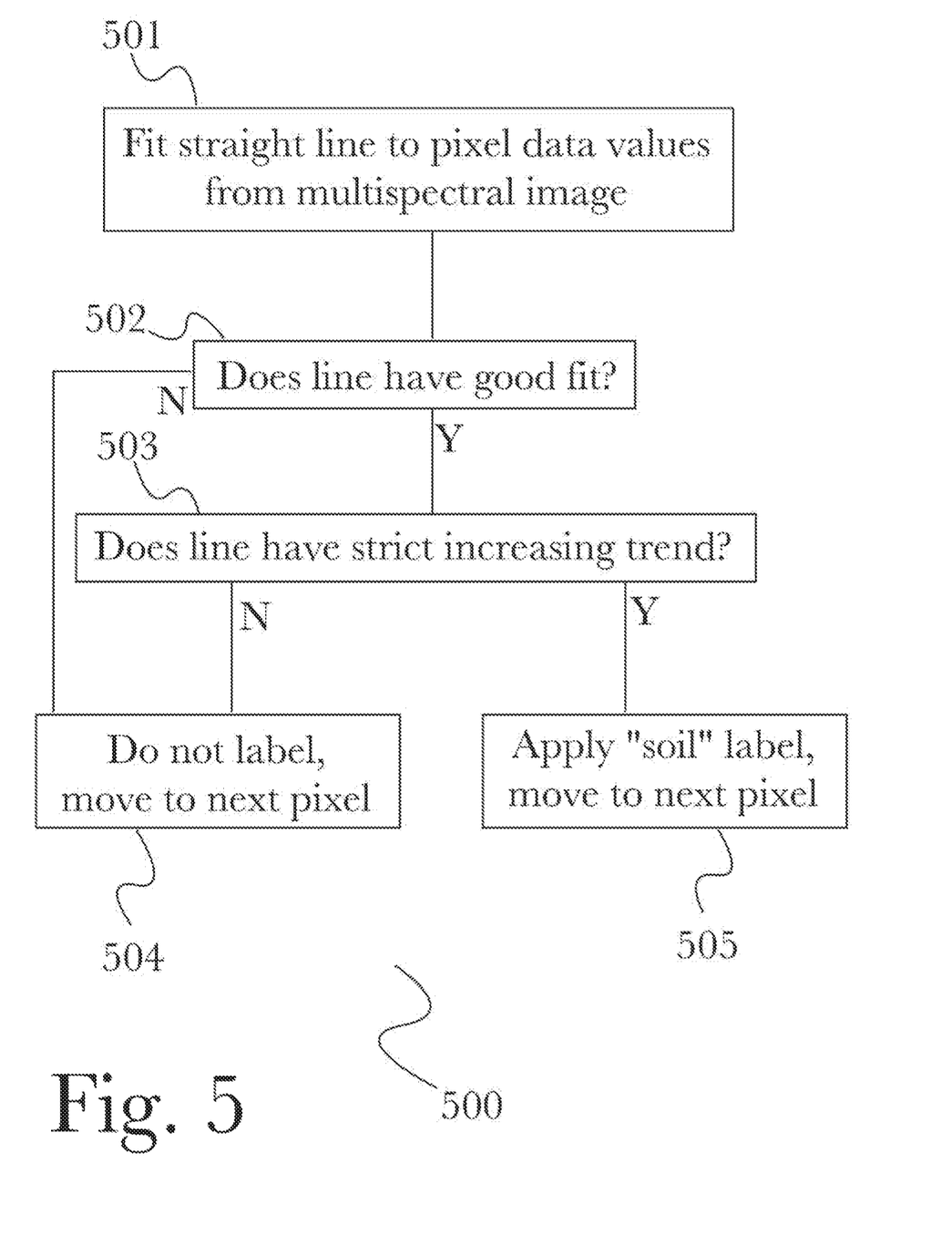
FIG. 5 is a flow diagram illustrating an exemplary method for unsupervised land use and land cover detection, illustrating a bare soil filtering process according to one aspect.

FIG. 5 is a flow diagram illustrating an exemplary method 500 for unsupervised land use and land cover detection, illustrating a bare soil detection process according to one aspect. According to the aspect, bare soil may be detected using a linear segment fitting method 500, wherein a classifier module 102 first fits a straight line to the available pixel data values 501. The line may then be checked for good fit 502 to the data values, as well as a strictly-increasing slope 503. If these are both true, the pixel may be labeled as "soil" 505 and processing continues to the next pixel. If either comparison fails, the pixel cannot be classified as soil, so no label is applied and processing moves to the next pixel in the image data 504.

Figure 6:
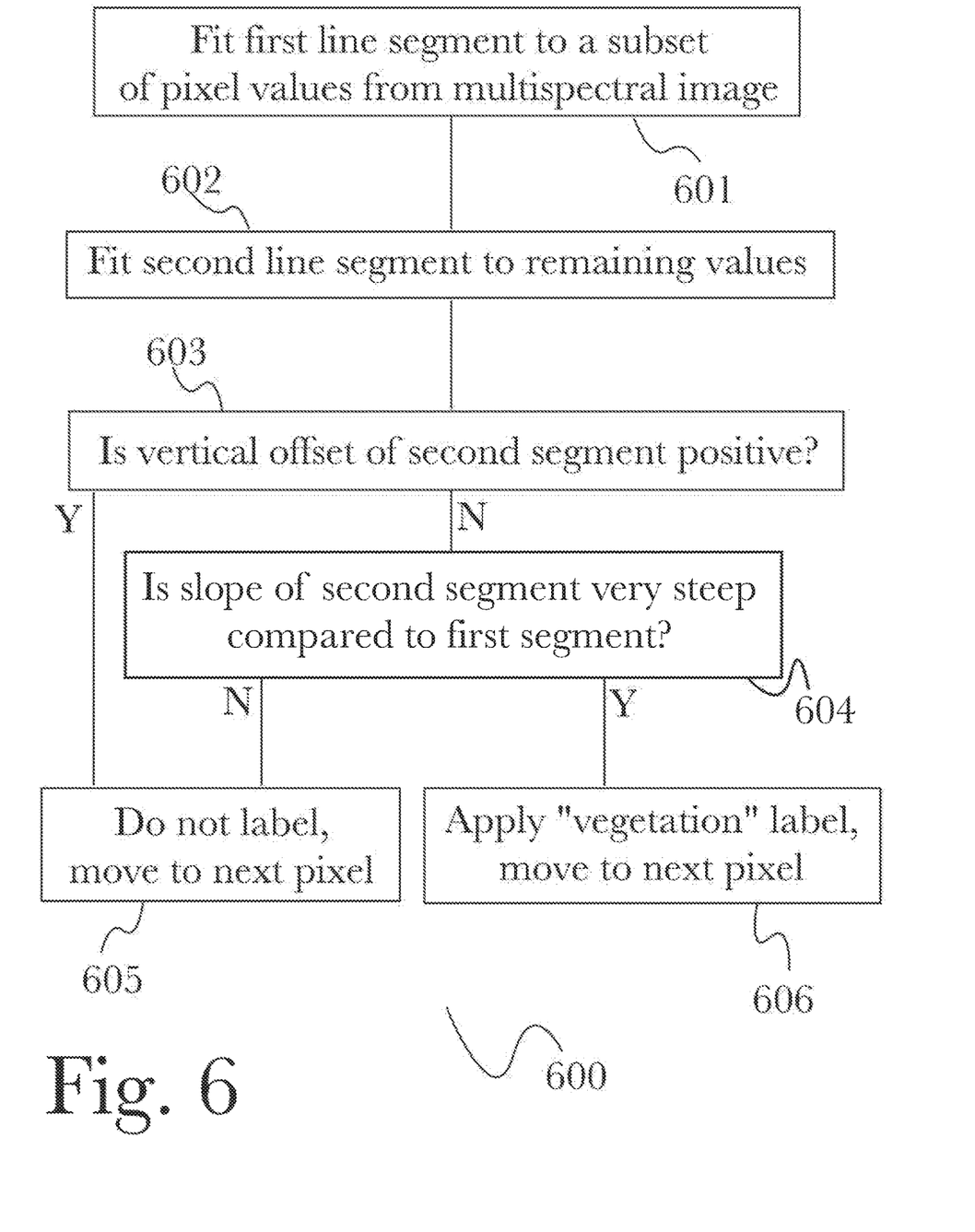
FIG. 6 is a flow diagram illustrating an exemplary method for unsupervised land use and land cover detection, illustrating a vegetation filtering process according to one aspect.

FIG. 6 is a flow diagram illustrating an exemplary method 600 for unsupervised land use and land cover detection, illustrating a vegetation detection process according to one aspect. According to the aspect, vegetation may be detected using a two-line segment fitting method 600, in which a first line segment is fitted to a subset of pixel data values 601 and a second line segment is fitted to the remaining pixel values 602. Then, the vertical offset of the second line segment is checked 603, and if it is positive the pixel is not labeled as vegetation and processing continues to the next pixel 605. However, if the offset is not positive (neutral or negative) and the angle is very steep 604 (for example, three times the slope of the first line segment), then the pixel is labeled as vegetation 606.

Figure 7:
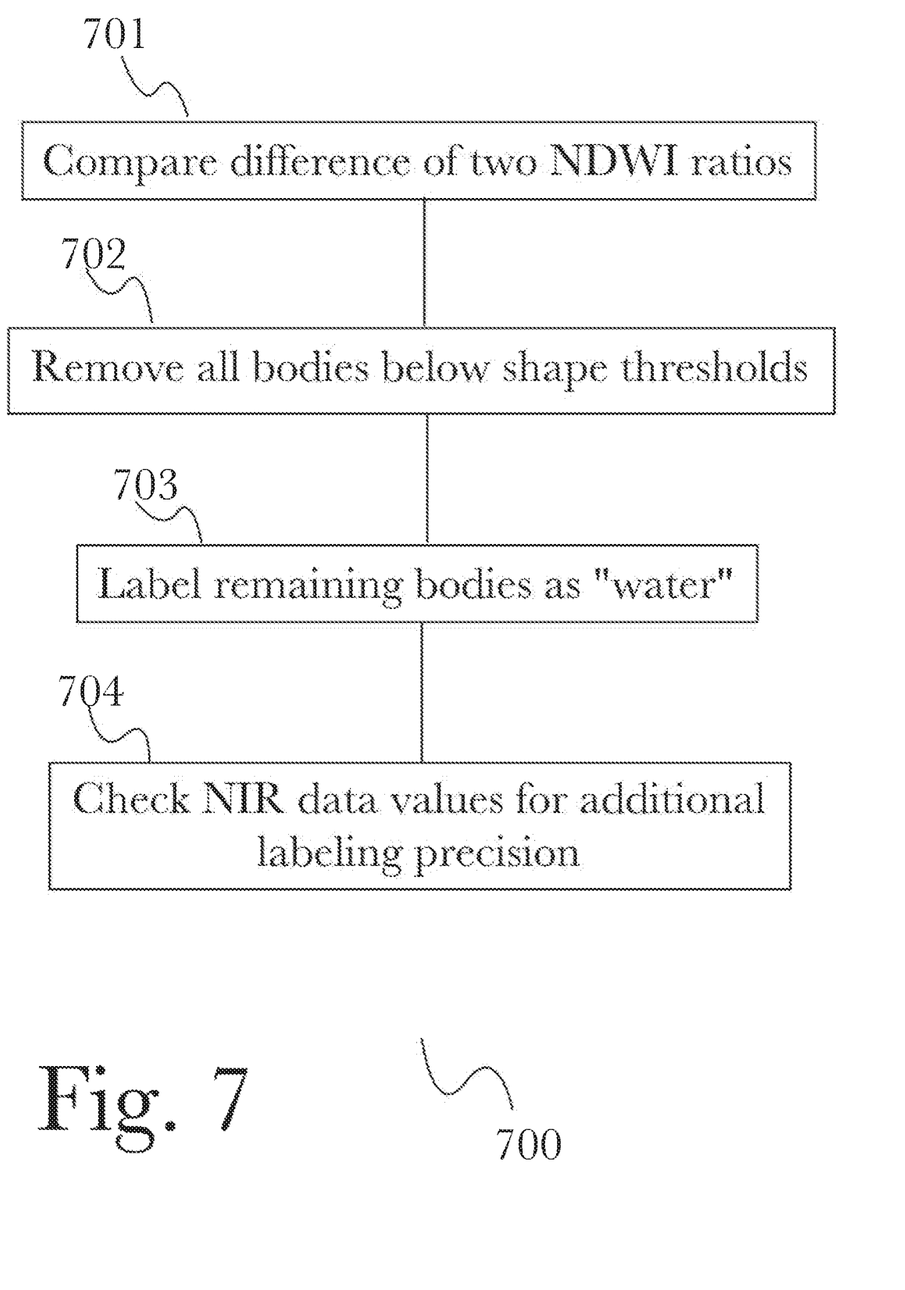
FIG. 7 is a flow diagram illustrating an exemplary method for unsupervised land use and land cover detection, illustrating a water filtering process according to one aspect.

FIG. 7 is a flow diagram illustrating an exemplary method 700 for unsupervised land use and land cover detection, illustrating a water detection process according to one aspect. According to the aspect, bodies of water may be detected using a normalized difference water index (NDWI) ratio discrimination method 700, in which the difference between two NDWI ratios is checked 701, and then all bodies below a plurality of defined shape thresholds (such as size or width) are removed 702. The remaining pixels after screening are labeled as "water" 703, processing the water label layer as a batch operation in a single pass. For additional precision, spectral data values for near infrared (NIR) may be checked 704, for example to label "swamp" in addition to "clear" water, which may have differing spectral characteristics due to, for example, vegetation growth in or on the water.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 8:
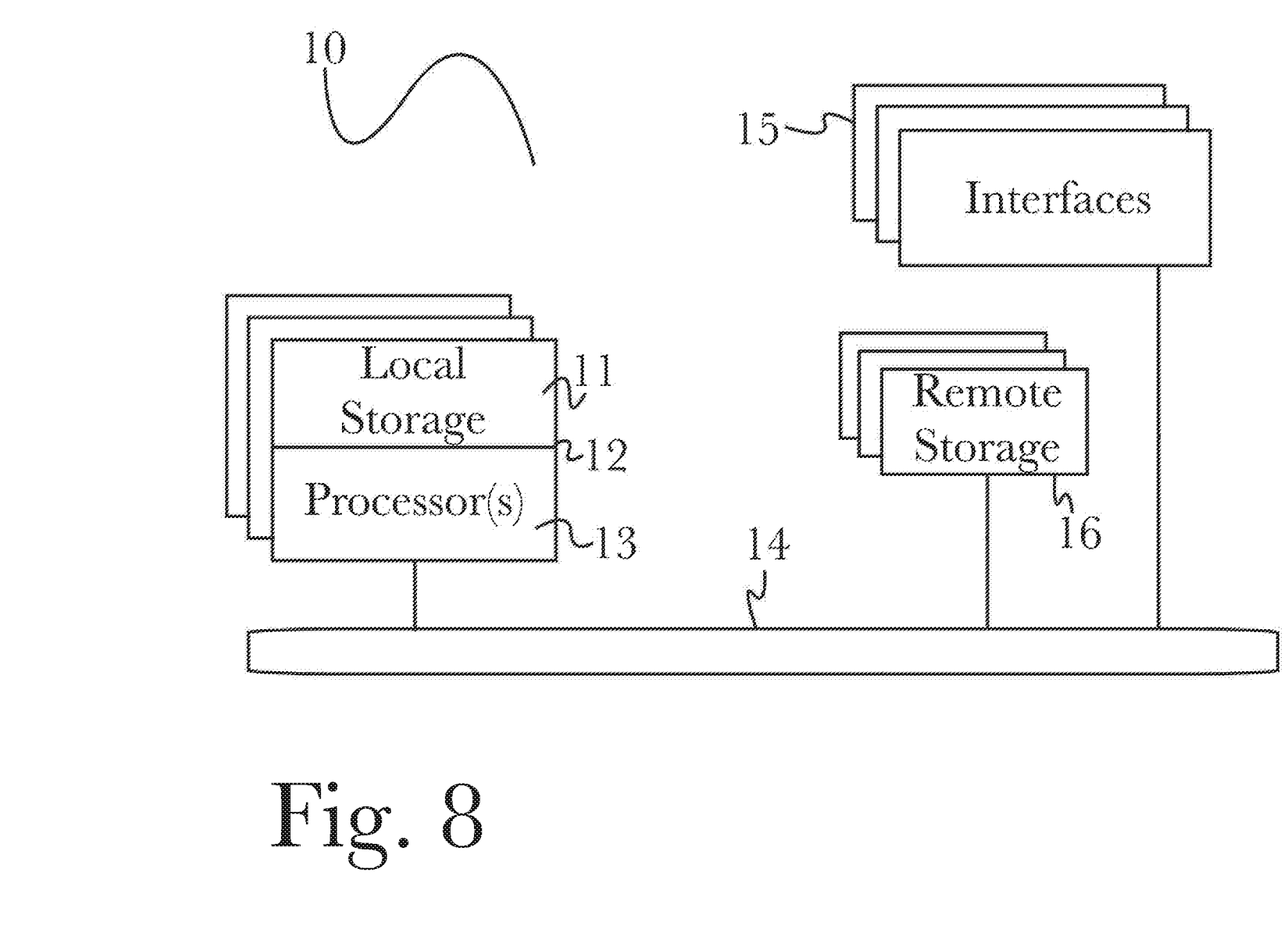
FIG. 8 is a block diagram illustrating an exemplary hardware architecture of a computing device.

Referring now to FIG. 8, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 8 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 9:
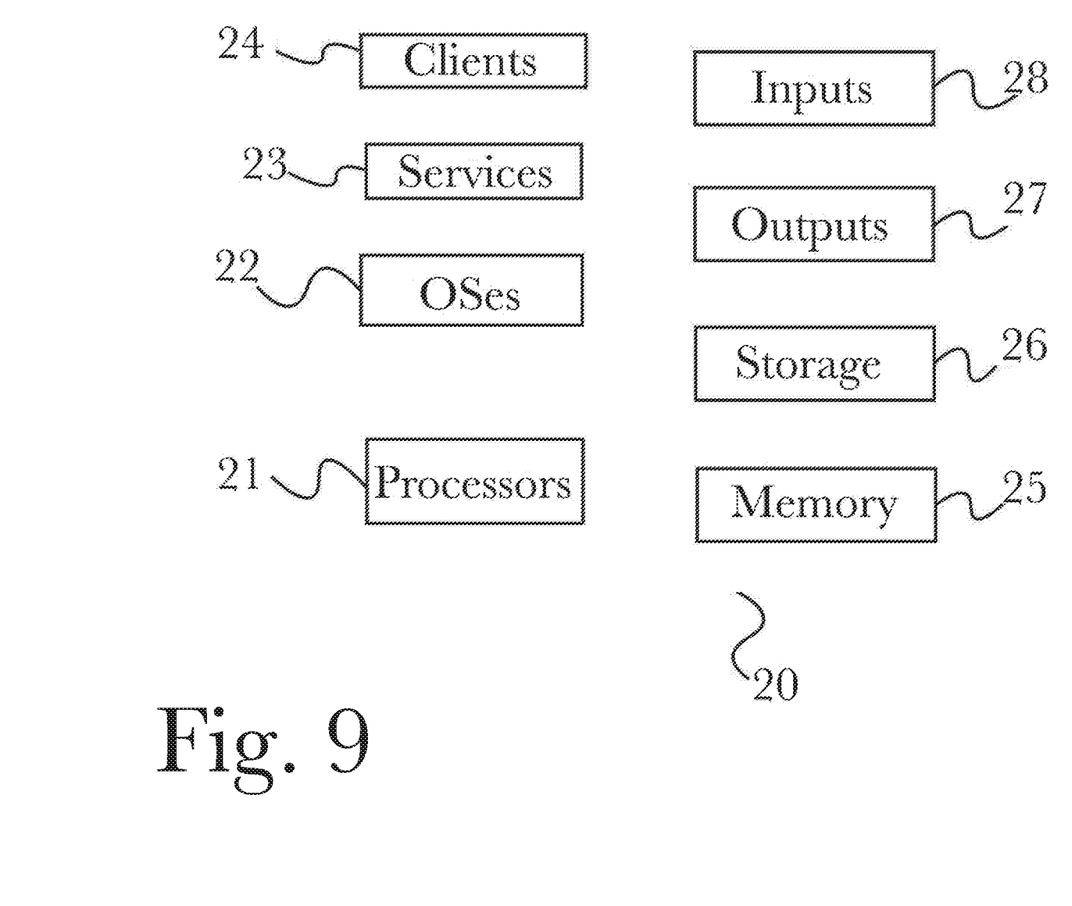
FIG. 9 is a block diagram illustrating an exemplary logical architecture for a client device.

In some aspects, systems may be implemented on a standalone computing system. Referring now to FIG. 9, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 8). Examples of storage devices 26 include flash memory, magnetic hard drive, CD-ROM, and/or the like.

Figure 10:
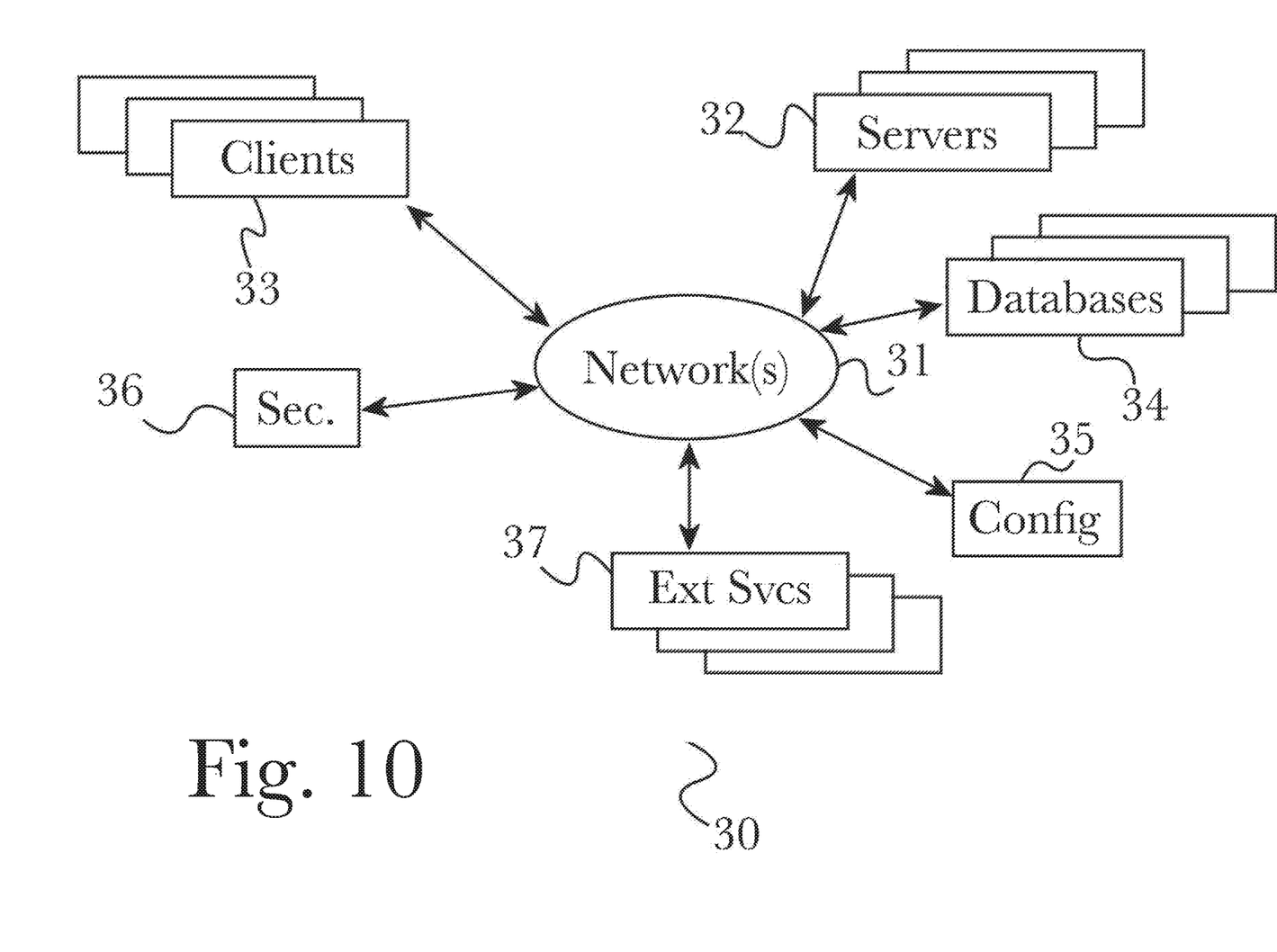
FIG. 10 is a block diagram showing an exemplary architectural arrangement of clients, servers, and external services.

In some aspects, systems may be implemented on a distributed computing network, such as one having any number of clients and/or servers. Referring now to FIG. 10, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 9. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 11:
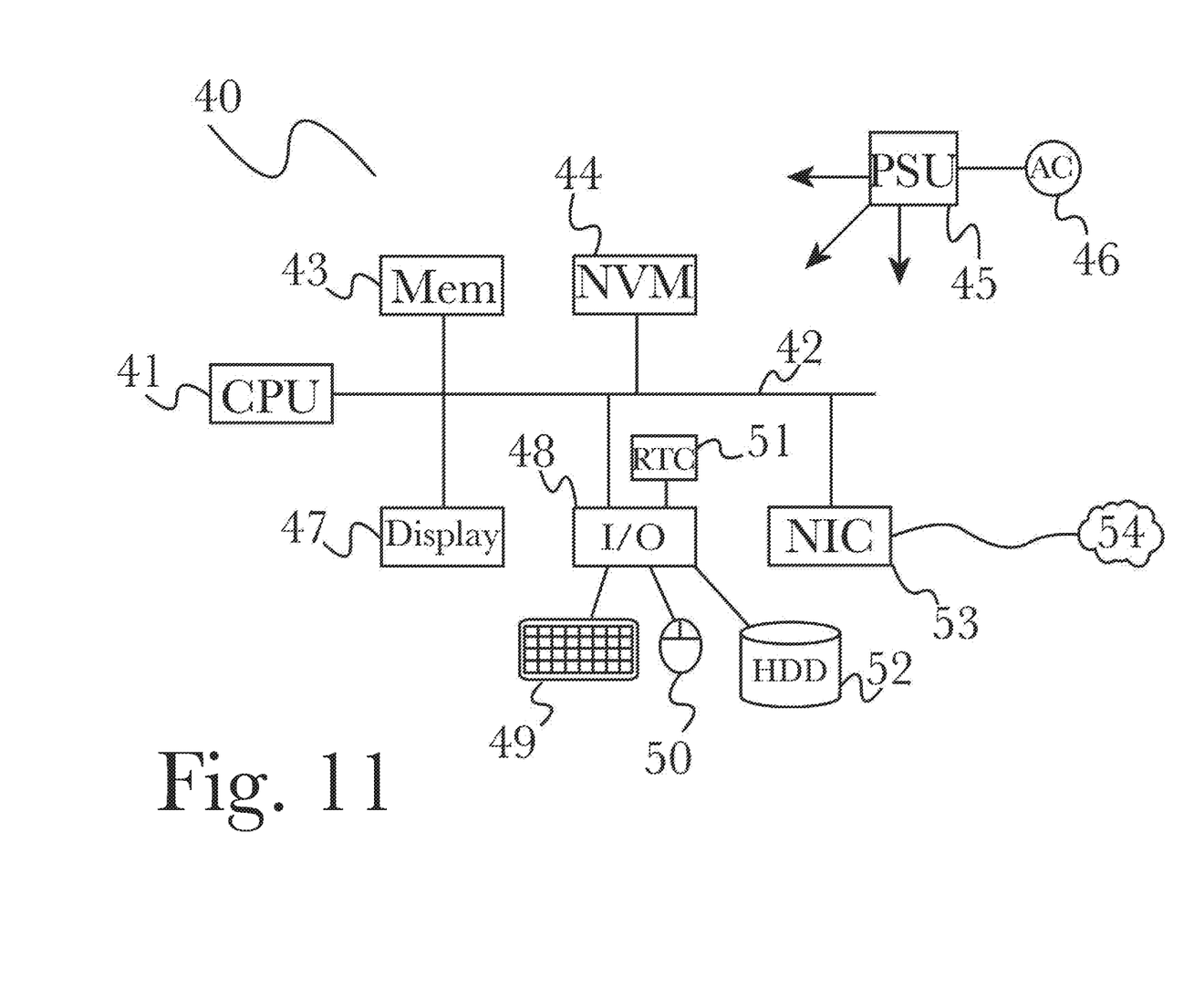
FIG. 11 is another block diagram illustrating an exemplary hardware architecture of a computing device.

FIG. 11 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for unsupervised land use and land cover detection, comprising:
a spectrum analyzer comprising a processor, a memory, and a plurality of programming instructions stored in the memory and operating on the processor, wherein the programming instructions, when operating on the processor, cause the processor to:
receive an image from an image source; and
algorithmically process the image to produce a plurality of class layers of image information within the image;
a class layer filtering module comprising a processor, a memory, and a plurality of programming instructions stored in the memory and operating on the processor, wherein the programming instructions, when operating on the processor, cause the processor to:
receive a plurality of class layers, wherein the layers comprise at least one of a cloud layer, a soil layer, a vegetation layer, a shadow layer, and a water layer; and
algorithmically process each layer to remove same-class pixel groupings that fail class-related size, shape and color criteria;
hierarchically filter the layers in order from the cloud layer, to the soil layer, to the vegetation layer, to the shadow layer, to the water layer;
a class resolution module comprising a processor, a memory, and a plurality of programming instructions stored in the memory and operating on the processor, wherein the programming instructions, when operating on the processor, cause the processor to:
receive a plurality of filtered class layers;
detect pixels in the stack of class layers that are assigned more than one class; and
perform of plurality of class-assignment confidence comparisons for each multi-class pixel to produce a single class label for that pixel; and
an image reconstruction engine comprising a processor, a memory, and a plurality of programming instructions stored in the memory and operating on the processor, wherein the programming instructions, when operating on the processor, cause the processor to:
receive a plurality of class image layers from the class resolution module; and
reconstruct the colored output image based at least in part on the filtered class image layers.

2. A system according to claim 1, wherein any dense cloud forms regardless of saturation levels are identified.

3. A system according to claim 1, wherein rocks, gravel, and sand are excluded.

4. A system according to claim 1, wherein the cloud layer is detected using a parabolic function fit calculation.

5. A system according to claim 1, wherein the soil layer is detected using a linear segment fitting calculation.

6. A system according to claim 1, wherein the vegetation layer is detected using a two-line segment fitting calculation.

7. A system according to claim 1, wherein the water layer is detected using a normalized difference water index ratio discrimination calculation.

* * * * *